Nov. 20, 1962 J. F. McCLELLAND, JR 3,064,783
CONSTRUCTION OF ARTICLE SUPPORTING CHUTES
Filed July 18, 1960 2 Sheets-Sheet 1
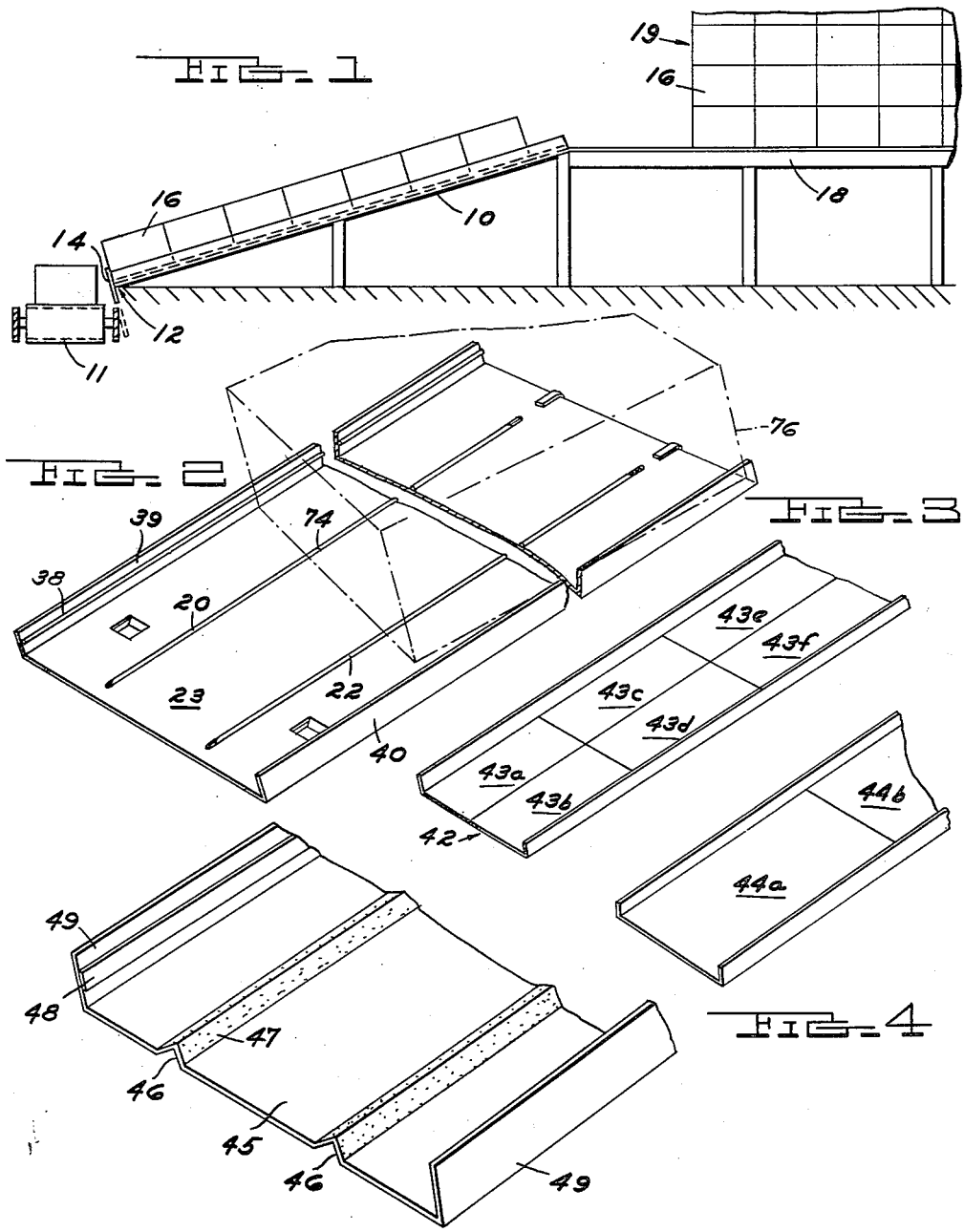
INVENTOR.
JAMES F. McCLELLAND JR.
BY
ATTORNEYS Nov. 20, 1962                J. F. McCLELLAND, JR                3,064,783
CONSTRUCTION OF ARTICLE SUPPORTING CHUTES
Filed July 18, 1960                                    2 Sheets-Sheet 2
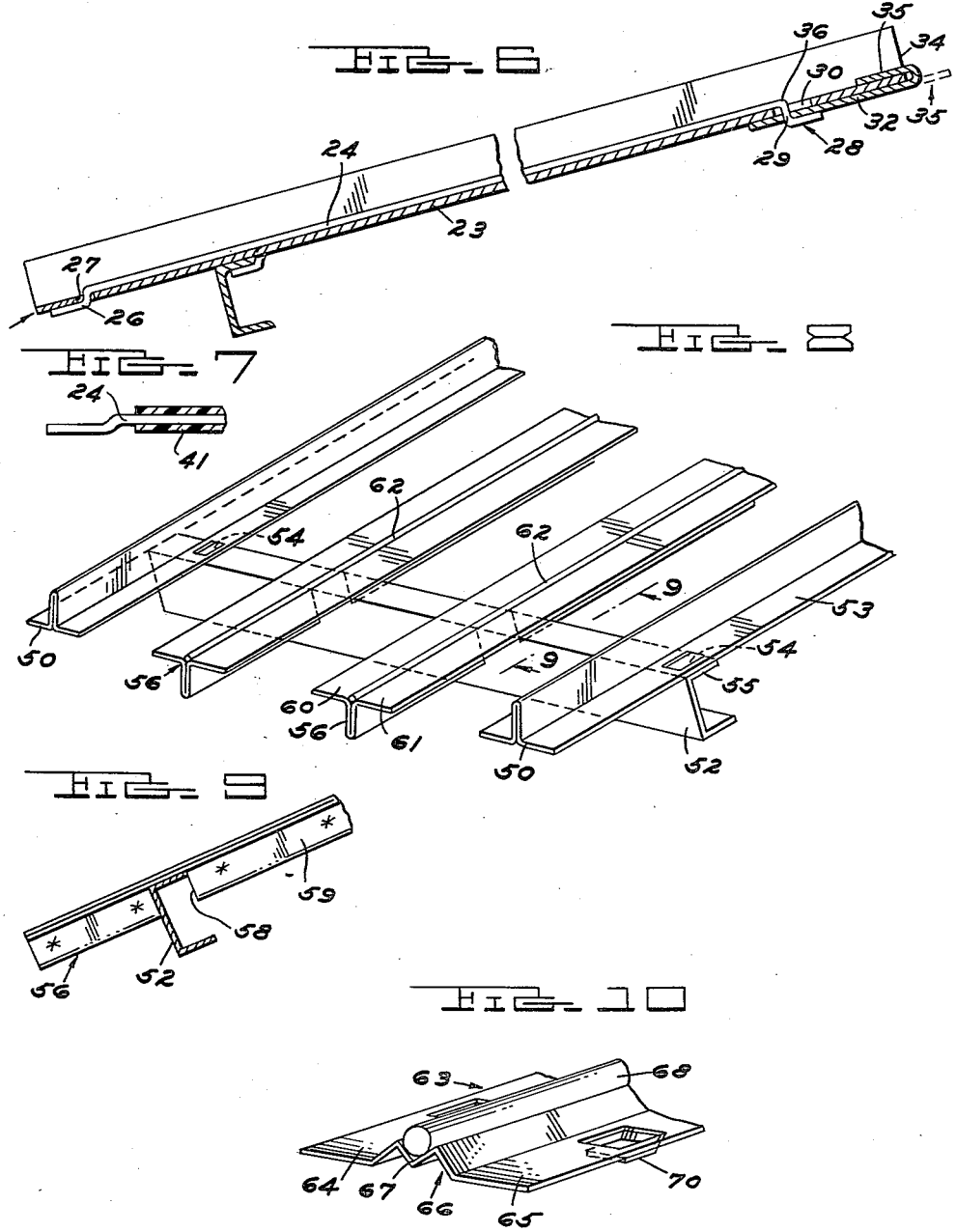
INVENTOR.
JAMES F. McCLELLAND JR.
BY
*Farley, Forster & Farley*
ATTORNEYS

3,064,783
CONSTRUCTION OF ARTICLE SUPPORTING CHUTES
James F. McClelland, Jr., Grosse Pointe Farms, Mich., assignor to Admos, Inc., Warren, Mich., a corporation of Delaware
Filed July 18, 1960, Ser. No. 43,652
19 Claims. (Cl. 193—38)

This invention relates to improvements in the construction of a chute for supporting and guiding an article down an inclined path. The invention has particular utility in connection with installations employing chutes on which articles are stored in a row on an incline so as to be continuously fed by gravity to the lower end of the chute from which an article is removed or released as required. Hence the features and advantages of the invention will be described with particular emphasis upon this type of installation, and chutes used therein will be referred to generally as "storage chutes."

Storage chutes are being employed in increasing numbers for the warehousing of articles, each chute acting as a bin for storing a number of articles of a particular type in a row, the chute being installed on an incline so that all articles supported thereon are at all times fed by gravity to the lower end of the chute. A warehouse installation of this kind can require a great number of chutes, these being installed side by side in rows and sometimes superimposed in tiers, or rows upon rows. Once a row of articles has been placed upon a chute of this kind, article movement is intermittent, taking place only when the lowermost article is removed or released from the chute. Consequently, each chute must be installed on an angle sufficiently great to positively insure intermittent article movement—in other words, to insure sufficient gravatational force to overcome starting friction between the articles and the chute, this being higher than sliding friction with conventional chute surfaces.

For example, it has usually been necessary to install chutes at an angle of approximately 30 degrees in order to insure intermittent motion of conventionally packaged articles along the chute, but when the amount of intermittent motion is reduced, the minimum being when an empty chute is loaded, then a package travelling down the chute will pick up considerable speed, and depending upon the momentum involved, damage to the package or to the structure can result when it is brought to an abrupt stop at the lower end of the chute. These problems can be increased by any change in the article being stored and handled on a particular chute to the point where a chute installation which has proved workable for one article may turn out to be completely unsatisfactory for another article.

The present invention offers a complete solution to the problems mentioned above as well as other advantages which will be brought out hereinafter. The invention provides a simple chute construction which incorporates means for improving and controlling the rate of movement of an article along an inclined chute; for changing this rate without changing the chute inclination; and, for a given inclination or chute, for varying the rate from one end to the other thereof.

A conventional chute consists of a plane surface with a side wall or guide at each side thereof. The chute of the present invention preferably consists of a pair or more of article supporting runners, instead of a flat surface, these runners being coated with a material selected to give the rate of article movement desired for a given chute inclination and given type of article. Preferably the article contacting surface of the runner is removable, or alternately, the entire runner member is removable, so that the surfaces of the runner can be changed to provide a new motion characteristic if required. A different material may be employed for each runner of a pair, and different materials can be employed along different portions of the surface of a single runner.

In one construction of the invention, a conventional type of chute is modified by removably installing a pair of runners, each of which consists simply in a length of wire surrounded by a casing or tube of the material which forms the article supporting surface, this assembly being laid along the plane surface of the chute. In another construction, runners are provided by forming raised ribs along the chute surface, these being coated by tape to form the article contacting surface. In another more simplified construction, the chute structure is formed merely by members which define the pair of chute side walls and a pair of members which define the runners, these latter members having a surface of article contacting material applied to them.

Obviously, various combinations of these examples of the invention are possible. A representative example particularly suited for storage chutes is a construction consisting of a conventional chute to which a pair of coated surface runners are installed. The same material is used throughout the surface of one runner, but the other runner of the pair has the upper portion of the length of its surface formed by material having a different frictional coefficient than the material of the other runner—a higher coefficient, for example. The remaining lower portion of this runner is coated with the same material employed for the other runner of the pair. Consequently an article traversing the upper portion of the chute tends to assume a cocked position in which its motion is further controlled by contact of a portion of the article with one of the chute side walls. When the article reaches the chute portion where the runner surfaces are formed of the same material, it tends to straighten out and travel at a faster rate.

Work on the development of the invention to date has revealed the existence of certain materials, which when employed for the surface of chute runners in accordance with the invention, permits continuous or intermittent movement of articles down the chute at greatly reduced rates and at greatly reduced angles of chute inclination.

Representative presently preferred embodiments of the invention are disclosed in the accompanying drawings which consist of the following views:

FIGURE 1, an elevation of a typical warehouse installation where chutes are employed for the storage and delivery of articles;

FIGURE 2, a perspective view of a conventional chute in which motion controlling article contacting surfaces have been provided;

FIGURES 3 and 4, each a perspective view of a chute showing another manner of providing motion controlling article contacting surfaces;

FIGURE 5, a fragmentary perspective view of an alternate chute construction;

FIGURE 6, a sectional elevation showing the installation of a runner on the chute shown in FIG. 2;

FIGURE 7, a fragmentary elevation similar to FIG. 6 showing an alternate runner construction;

FIGURE 8, a fragmentary perspective view showing the lower end of an alternate chute construction;

FIGURE 9, a fragmentary sectional elevation taken as indicated by the line 9—9 of FIG. 7; and FIGURE 10, an alternate construction for a runner of a chute such as shown in FIG. 7.

A typical chute installation for a warehousing operation is illustrated in FIG. 1. A number of chutes, such as the chute 10, are installed in a row on an incline, with conveying means such as the belt conveyor 11 extending along adjacent the lower or discharge end 12 of each chute. A suitable gate or release device 14 is installed at the discharge end 12 of each chute and is operable by means not shown between a normal or blocking position and a releasing position. With the gate 14 in normal position, each chute 10 serves to store a row of articles 16 for normal gravity urged movement toward the discharge end 12 of the chute and for release from the chute by operation of the gate 14. The installation includes suitable elevated structure 18 for supporting a reserve bank 19 of articles 16 adjacent the upper end of the chutes.

Conventionally each chute 10 is of sheet metal construction and has a plane supporting surface bordered by a pair of guide rails. Sliding friction between an article 16 and supporting surface is relatively high. Starting friction is even higher and in consequence, for the handling of articles packaged in conventional paper or cardboard cartons, the chute 10 must be installed on an incline in the order of 30 degrees in order to insure that the row of articles 16 held in storage on the chute will start up and advance toward the discharge end thereof each time the release gate 14 is operated. When the chute 10 is empty or almost empty and is reloaded, the initial articles will acquire some momentum before reaching the lower end of the chute. This necessitates a heavier and more costly construction for the gate 14.

In the chute construction of the invention, one or more motion controlling article supporting or contacting surfaces are provided on the chute.

The first example of such a construction is shown in FIGS. 2 and 6 wherein a pair of runners 20 and 22 are installed in parallel spaced relation along the plane surface 23 of a conventional type of chute. Each of the runners 20 and 22 may consist of a length of wire 24 selected for its frictional characteristics when employed as a supporting surface for the particular article to be handled on the chute. One end of the wire 24 is preformed with a Z-shaped portion 26 which is inserted through a hole 27 adjacent the lower end 12 of the chute. The other end 28 of the wire is similarly formed but with a longer offset portion 29. This end 28 of the wire is inserted through a slot 30 in the chute and through a hole in a strip 32 of sheet metal which is long enough to normally project beyond the upper end 34 of the chute as indicated in phantom at 35. Thus, this portion 35 of the strip 32 can be engaged with a suitable tool such as a pair of pliers and pulled to draw the wire 24 reasonably taut along the length of the chute. The portion 35 is then bent over the upper surface of the chute as shown in FIG. 6, where it serves to retain the wire in taut assembled relation with the chute and also as a skid or deflector for preventing articles from becoming snagged on the upper corner 36 of the runner when being loaded on the chute. Optionally, the chute construction may include a similar runner 38 installed along one or both of the chute side walls 39 and 40.

A variant type of runner construction (FIG. 7) consists of tubular material 41, such as some type of plastic, strung on the wire 24 to form the article contacting surface of the runner. With this construction, sections of different material may be mounted in end-to-end relation on a single runner thereby varying the motion controlling characteristics along the length thereof.

This principle of controlling motion along a chute is further illustrated in FIGS. 3 and 4. In FIG. 3 a conventional chute 42 has panels 43a–f applied to its surface. Each of the panels may consist of a material whose frictional or motion controlling characteristics are different from those of each other panel. In FIG. 4, the chute 42 is covered with similar panels 44a–b, except that each of these panels covers the width of the chute, whereas each of the panels 43a–f covers only a portion of the chute width. Motion control may thus be obtained from side-to-side along the chute, or lengthwise of the chute, or in any desired combination of either.

A construction is shown in FIG. 5 in which runners are provided along the length of a sheet metal chute 45 by integral projections or ribs 46. An article supporting surface is formed on these ribs as by applying a coating of tape 47 thereto, the tape being made of a particular material selected for its frictional characteristics. Similarly a strip of tape 48 may be applied by adhesive to one or both of the side walls 49 of the chute.

Another form of chute construction is shown in FIGS. 8 and 9. T-shaped sheet metal members 50 are mounted on a suitable number of supports such as the member 52 in inverted position to form the side rails of a chute or a common side rail between an adjacent pair of chutes. These members 50 may be held in position on their supports by any suitable means such as a tang 54 punched from one of the horizontal surfaces 53 of the member 50 and bent downwardly and inwardly over the flange 55 of the supporting member 52, as more fully disclosed in the co-pending application of A. J. Nagy, Serial No. 46,472, owned by the assignee of the present application. At least a pair of similar T-shaped sheet metal members 56 are mounted intermediate the members 50 in the opposite or upright position of their T-section. A notch 58 is cut in the stem portion 59 of the T-section to slip over each support member 52 as shown in FIG. 9. The T-shaped sheet metal construction of the members 56 provides a longitudinal extending groove between the flanges 60 and 61 of each member, and an article supporting surface is formed by laying a runner 62 along this groove in each of the members 56. The runner 62 may be similar in construction to the runner of FIG. 6 or FIG. 7.

Another possible form of intermediate chute member 63 is shown in FIG. 10 where a length of sheet metal is formed with a pair of horizontal side flanges 64 and 65 and a central M-section 66 which provides a V-shaped groove 67 for the installation of a runner 68 which forms the article supporting surface. Member 63 may be installed in a manner similar to the members 50 shown in FIG. 6—that is by punching a tang 70 from one or both of the flanges 64 and 65.

The side rail and intermediate chute members of FIGS. 6–8 can readily be moved on their supports to change chute widths for handling articles of different dimensions, and the runners of the intermediate members may also be changed to provide different motion control.

All chute constructions described have the common feature of providing an article contacting surface consisting of material applied to the chute and selected to give desired movement characteristics for a given article and degree of incline.

In general, this control over article movement is obtained in one of the following ways, or in some combination thereof:

(a) By selecting the material for the applied article contacting surface which gives the desired starting characteristic and rate of movement for a given chute inclination and article.

(b) By employing a different material along one side of the chute than along the other side.

(c) By employing an article engaging surface along either or both of the chute side rails in combination with a supporting surface.

(d) By employing a different material along one portion of the length of a chute than along the remaining portion thereof.

From work done to date on motion controlling surface materials for chutes, the most promising field is in those materials whose coefficient of starting friction does not exceed their coefficient of running or sliding friction. In other words, a material best suited for a motion controlling surface of a chute offers resistance to starting which is on the same order or preferably less than the resistance to sliding motion. A coefficient of friction is a constant only for a given condition of the contacting surfaces and hence a motion controlling material cannot be accurately specified in terms of a coefficient of friction. The frictional characteristic of the material of the package being handled on a chute will vary not only with changes in the material of which the package is made but also with the condition of the package, with temperature, humidity and possibly other factors all of which contribute to making a coefficient of friction a variable quantity in the handling of packages on the chutes.

Therefore, the field of promising materials must be governed by the general frictional characteristic of each as mentioned above. A particular coefficient of friction can be taken as an indication of the desired general characteristic.

Within the field of promising materials, stainless steel has been found suitable as also has glass. Plastic materials offer a particularly wide selection because many of them have the desired general characteristic of offering the same or less resistance to starting than to sliding motion. Furthermore, the wearing qualities of many of these materials are high, their cost is relatively low and they are commercially available in sheet, strip, rod, or tubular form making them easy to apply to a chute as a motion controlling surface.

All possible plastic materials have not yet been investigated, but within this general class, it has been found that certain of the high density poly-ethylene materials give particularly desirable results. By using article supporting runners of these materials, a material reduction in the angle of chute inclination can be obtained, thus enabling a considerable saving in the vertical structure required for an installation such as shown in FIG. 1, and making it proportionately easier to handle articles up to the reserve storage bank area 19.

In addition to decreasing the angle of chute inclination, use of the invention offers improved control over the motion of an article along the chute installed at any particular inclination. The time required for an article of a particular type to move the length of a particular chute can be changed from seconds to minutes merely by employing the right article contacting surface on the chute. At the same time it becomes possible to change the rate of movement of the article from one portion of the chute to another portion thereof.

For example, in the construction shown in FIG. 2, the portion of the runner 20 above the line 74 thereon is covered with a material which has a higher frictional resistance than the material employed for the surface of the runner 22, while the portion of the runner 20 below the line 74 is coated with the same material as is the runner 22. Thus an article travelling the chute will first tend to assume a cocked position as indicated by the article 76 shown in phantom. This brings the sides of the article into contact with the sides of the chute, further increasing resistance to movement of the article as it traverses that portion of the chute above the line 74. Below line 74 the chute runners offer decreased, equal frictional resistance and the article therefore tends to straighten out and move at a faster rate. This type of construction is particularly advantageous in the installation shown in FIG. 1 because the overall rate of movement of an article traversing the chute can be slowed to a point where the impact between the first article placed on the chute and the release gate 14 is materially lessened, yet the rate of movement of articles immediately adjacent the release gate is great enough to insure that they will pass over the end of the chute with dispatch each time the gate is moved out of its blocking position.

As an example of a representative construction, a 27 ft. sheet metal chute 15 in. wide with 1½ in. side rails was employed for handling articles packaged in cartons of corrugated board weighing about 25 lbs. each. These cartons were 13 in. square and 10 in. high. With conventional construction it was found that this chute had to be installed on an incline of approximately 27 degrees in order to insure positive article movement under all conditions. The impact between the first article loaded and the release gate was severe. This chute was then modified by the installation of a pair of runners along its article supporting surface in the manner shown in FIGS. 2 and 7. One of the runners consisted of "Marlex" 6000, Type 2, high density poly-ethylene tubing manufactured by Phillips Chemical Co., having an outside diameter of ⅗₁₆ in. and mounted on a wire 24 as shown. With an identical construction for the other runner it was found that the chute inclination could be reduced to 17 degrees with fully positive article movement under all conditions. The time required for the first article to traverse the chute was approximately five seconds resulting in an impact which was still relatively high. This construction was then modified by substituting for one of the runners, for example, the runner 20 in FIG. 2, a runner whose supporting surface along the upper 17 ft. of its length was formed by high density poly-ethylene resin tubing known as T.R. 212 manufactured by Phillips Chemical Co., the lower 10 ft. of the runner supporting surface being formed by Marlex 6000, Type 2 as before. With this runner construction a traversing article assumed a cocked position while travelling over the upper 17 ft. of the chute as shown in FIG. 2 and then straightened out during its passage at an increased rate over the lower 10 ft. The time for a single package to continuously travel the length of the chute was increased to approximately sixteen seconds and the impact was correspondingly reduced. A further reduction in traversing time can of course be obtained by employing materials offering higher frictional resistance. For example, using Alathon No. 3, a low density poly-ethylene manufactured by Du Pont for the runner surfaces, the traversing time can be increased to minutes yet article movement will always be positive even under start and stop conditions.

In general, chute constructions employing motion controlling materials having different surface characteristics are preferred for storage chutes—at least along the upper portion of the chute length. With two surfaces materials, it is best to alternate them from one side of the chute to the other, thereby tending to prevent contact between the article and chute side walls and thus obtain more exact motion control. Lighter packages generally require a greater difference between the frictional characteristics of the two materials.

From the foregoing, it will be seen that the invention offers the following advantages over conventional chute constructions.

(a) The chute inclination can be materially reduced with commensurate savings in installation and handling costs.

(b) Positive article movement is obtained with decreased chute inclination.

(c) The rate of article movement can be controlled over the length of a single chute.

(d) The motion controlling characteristics of a chute can readily be changed without changing the chute inclination by installing a motion controlling surface or surfaces having different frictional characteristics.

(e) The chute structure can be simplified by employing individual side rails and runner supporting members rather than the conventional unitary construction.

(f) Storage chute installations of the foregoing type offer increased flexibility in handling articles of different size.

Other advantages will be apparent to those skilled in the art as will modifications to the representative constructions disclosed. Such modifications as are in the scope of the following claims are therefore to be considered a part of the present invention.

I claim:

1. A chute structure for supporting and conveying an article down an inclined plane characterized by the article supporting portion of said chute structure including means for forming at least a pair of article contacting surfaces extending along the length of said chute, at least a portion of one of said pair of surfaces differing from the other of said pair in frictional characteristics.

2. A chute according to claim 1 further characterized by said chute structure including a pair of spaced parallel side rails, said article contacting surfaces being located intermediate said side rails whereby an article traversing that portion of the chute where said contacting surfaces differ in frictional characteristics tends to be cocked into engagement with at least one of said side rails.

3. A chute according to claim 2 further characterized by a runner member having a surface of desired frictional characteristics mounted on at least one of said side rails.

4. A chute according to claim 1 further characterized by the said portion of said one surface differing in frictional characteristics from the remaining portion of said one surface.

5. A chute according to claim 1 wherein said means for forming at least a pair of article contacting surfaces comprises at least a pair of runner members, means for mounting said runner members on an incline in spaced parallel relation, one of said article contacting surfaces being applied to each of said runner members.

6. A chute according to claim 1 wherein the said portion of one of the pair of surfaces which differs from the other of said pair in frictional characteristics extends along the upper part of the chute, said pair of article contacting surfaces having the same frictional characteristics along the lower part of the chute.

7. In a chute structure for supporting and intermittently slidably conveying an article down an inclined plane by gravity, means for controlling the rate of article movement without changing the angle of inclination comprising a pair of runner members supported by said structure, each of said runner members having a material applied thereto to form an article contacting surface, said material being one whose frictional characteristics are such as to offer not substantially greater resistance to starting than to sliding movement of said article, and means for detachably connecting said runner members to said chute structure whereby a runner member can be replaced by one having an article contacting surface offering different resistance to article movement.

8. A chute structure according to claim 7 further characterized by each of said runner members including a length of wire, means for detachably connecting said wire to said chute structure comprising an aperture in said chute structure adjacent each end thereof, the ends of said wire each extending through one of said apertures, at least one of said apertures being elongated lengthwise of said chute structure, and means engaging the wire end extending through said elongated aperture and engageable with said chute structure whereby said wire can be pulled taut and anchored in position.

9. A chute structure according to claim 8 wherein said wire engaging means comprises a clip member, said clip member including a portion projecting beyond one end of said chute structure and overlappingly engageable therewith.

10. A chute structure according to claim 7 further characterized by said runner members each including a length of wire, means for detachably interlocking one end of said wire to said chute structure adjacent the lower end thereof and means whereby the other end of said wire can be pulled taut from the upper end of said chute structure and detachably anchored thereto including a clip member engageable with said other wire end and having a portion which is deformable into engagement with said chute structure.

11. A chute structure for supporting and intermittently slidably conveying an article down an inclined plane characterized by the article contacting surface of said chute being formed by a pair of runner members supported by said structure and extending between the upper and lower ends of the chute in longitudinal parallel relation, each of said runner members having an article contacting surface of a material whose frictional characteristics are such as to offer not substantially greater resistance to starting than to sliding movement of said article, said material on the lower portion of at least one of the runner members being different from and offering less resistance to article movement than the material on the upper portion thereof.

12. A chute according to claim 11 further characterized by said chute structure including at least a pair of article supporting members, means mounting said supporting members in parallel spaced relation, and means mounting said runner means on said supporting members.

13. A chute according to claim 12 further characterized by said supporting member mounting means including means whereby the spacing between said article supporting members can be varied.

14. A chute according to claim 12 further characterized by said chute structure including a pair of side rail members.

15. A chute according to claim 11 further characterized by each of said runner members including a length of wire, means for detachably connecting said wire to said chute structure comprising an aperture in said chute structure adjacent each end thereof, the ends of said wire each extending through one of said apertures, at least one of said apertures being elongated lengthwise of said chute structure, and means engaging the wire end extending through said elongated aperture and engageable with said chute structure whereby said wire can be pulled taut and anchored in position.

16. A chute according to claim 15 wherein said wire engaging means comprises a clip member, said clip member including a portion projecting beyond one end of said chute and overlappingly engageable therewith.

17. A chute according to claim 11 wherein said runner members consist of sheet material.

18. A chute according to claim 11 further characterized by means for detachably connecting said runner members to said chute structure.

19. A chute according to claim 11 further characterized by said runner members each including a length of wire, means for detachably interlocking one end of said wire to said chute structure adjacent the lower end thereof and means whereby the other end of said wire can be pulled taut from the upper end of said chute structure and detachably anchored thereto including a clip member engageable with said other wire end and having a portion which is deformable into engagement with said chute structure.

References Cited in the file of this patent

UNITED STATES PATENTS

| | | |
|---|---|---|
| 1,124,629 | Lilienfeld | Jan. 12, 1915 |
| 1,416,073 | Steinbach | May 16, 1922 |
| 1,626,242 | Lanza | Apr. 26, 1927 |
| 1,647,665 | Riche | Nov. 1, 1927 |
| 1,677,764 | Gloekler | July 17, 1928 |
| 2,392,789 | Watter | Jan. 8, 1946 |
| 2,441,913 | Taylor | May 18, 1948 |
| 2,571,479 | Parks | Oct. 16, 1951 |
| 2,733,801 | Dryg | Feb. 7, 1956 |
| 2,742,288 | Brunel | Apr. 7, 1956 |
| 2,815,252 | Baker | Dec. 3, 1957 |

FOREIGN PATENTS

| | | |
|---|---|---|
| 965,626 | Germany | June 13, 1957 |